(12) United States Patent
Sharma et al.

(10) Patent No.: US 9,082,093 B2
(45) Date of Patent: Jul. 14, 2015

(54) SYSTEM AND METHOD FOR NON-PRODUCTION ENVIRONMENT MANAGEMENT

(71) Applicant: Infosys Limited, Bangalore (IN)

(72) Inventors: Parveen Kumar Sharma, Punjab (IN); Soumitro Mukherjee, Calcutta (IN)

(73) Assignee: Infosys Limited, Bangalore (IN)

( * ) Notice: Subject to any disclaimer, the term of this patent is extended or adjusted under 35 U.S.C. 154(b) by 8 days.

(21) Appl. No.: 13/890,889

(22) Filed: May 9, 2013

(65) Prior Publication Data

US 2013/0305210 A1 Nov. 14, 2013

(30) Foreign Application Priority Data

May 9, 2012 (IN) .......................... 1817/CHE/2012

(51) Int. Cl.
*G06F 9/44* (2006.01)
*G06Q 10/06* (2012.01)

(52) U.S. Cl.
CPC . *G06Q 10/06* (2013.01); *G06F 8/20* (2013.01)

(58) Field of Classification Search
CPC .. G06F 11/3688; G06F 11/44589; G06F 8/20
USPC ......................................... 717/102, 124, 126
See application file for complete search history.

(56) References Cited

U.S. PATENT DOCUMENTS

| | | | |
|---|---|---|---|
| 5,557,774 A * | 9/1996 | Shimabukuro et al. ......... 703/21 |
| 5,651,111 A * | 7/1997 | McKeeman et al. ......... 714/38.1 |
| 5,778,390 A * | 7/1998 | Nelson et al. .......................... 1/1 |
| 7,711,693 B2 * | 5/2010 | Shih et al. ...................... 707/602 |
| 8,839,222 B1 * | 9/2014 | Brandwine et al. ........... 717/168 |
| 2005/0204201 A1 * | 9/2005 | Meenakshisundaram et al. ............................... 714/38 |
| 2006/0025985 A1 * | 2/2006 | Vinberg et al. .................. 703/22 |
| 2007/0283282 A1 * | 12/2007 | Bonfiglio et al. .............. 715/762 |
| 2012/0084607 A1 * | 4/2012 | Lam et al. ..................... 714/38.1 |

(Continued)

OTHER PUBLICATIONS

Wang, "The Research and Design of NSL-Oriented Automation Testing Framework", 2012.*

(Continued)

*Primary Examiner* — Phillip H Nguyen
(74) *Attorney, Agent, or Firm* — LeClairRyan, a Professional Corporation

(57) ABSTRACT

The present invention discloses a system and method for management of test or non-production environment. The method comprises planning the non-production environment design, wherein planning is based on plurality of inputs. The planning stage is preceded by engagement wherein engagement with functional groups takes place. The planned non-production environment design is analyzed based upon the requirements wherein analysis consists of reviewing plurality of non-production environment designs. This stage is followed by creation of non-production environment wherein non-production environment is built on analyzed design. After this stage the non-production environment is deployed. After deployment there is provision for on-going supports to test services via established Information Technology service management processes. Non-production environment services manage the on-going booking and allocation of the non-production environment through various in-house and third party tools. The non-production environment services constantly assess the non-production environment so that the non-production environment can be re-used wherever possible.

15 Claims, 12 Drawing Sheets

(56) References Cited

U.S. PATENT DOCUMENTS

2013/0042151 A1*  2/2013  McCoy et al. ............... 714/38.1
2013/0174117 A1*  7/2013  Watters et al. ............... 717/106

OTHER PUBLICATIONS

Vinogradov et al., "Evaluation of Data Anonymization Tools", 2012.*
Gillenson, "Non-Production Environment Management," Presentation (Dec. 15, 2009).
Allen, "Enterprise Environment Management," Presentation (Sep. 2010).
Krishnankutty and Illimattathil, "Enhancing Test Effectiveness Through Test Data Management," (May 2010).
The International Foundation for Information Technology, "The Information Technology (IT) Environment Framework," Web page (Oct. 2011) http://www.if4it.com/SYNTHESIZED/FRAMEWORKS/ENVIRONMENT/environment_framework.html.

* cited by examiner

| RACI Matrix - engagement and planning stage | | | | | | |
|---|---|---|---|---|---|---|
| Stage Activities | ES Internal Roles | | | External Roles | | |
| | ES Project Manager | ES Project Analyst | Demand Manager | IT Project Manager | Test Manager | Solution Architect |
| Engage with IT Programmes/Projects | AR | I | CI | C | | |
| Prepare Demand pipeline | I | I | AR | CI | | |
| Gather High Level Project Requirements, High Level Solution, Test Strategy & High Level Milestone Plan | AR | I | I | C | C | C |
| Prepare High Level Environment Delivery Plan | AR | R | | CI | CI | I |
| Conduct Feasibility Analysis and Cost Estimation | A | R | I | CI | CI | I |
| Engage Procurement as required | AR | I | | CR | CI | I |

FIG. 4

SYSTEM AND METHOD FOR NON-PRODUCTION ENVIRONMENT MANAGEMENT

This application claims the benefit of Indian Patent Application No. 1817/CHE/2012, filed May 9, 2012, which is hereby incorporated by reference in its entirety.

FIELD OF INVENTION

The invention relates to management of environment in general and system and method of management of non-production environment in particular.

BACKGROUND

Prior to deploying a client application for providing client information and services to a production network, companies typically implement a set of pre-defined procedures for identifying and resolving problems with the application and for generally verifying that the application functions as intended. A test or non-production environment within which the application may be deployed for the purpose of implementing such procedures is usually maintained. The test or non-production environment may also be utilized for resolving issues with existing client applications or production network infrastructure.

Large distributed test or non-production environments can include hundreds of test computers and multiple platforms. Distributed test or non-production environments are used to test any number or variety of software products. Software testing can include functional testing, operating system testing, testing for games, software development, database environments, communication software and any software wherein a large distributed test environment with many machines would be suitable. The growing complexity, scale and changing nature of non-production environments leads to lack of visibility into non-production environments. Environment issues in test or non-production environment can cause loss in IT projects.

Although existing prior art discloses and addresses various issues in test or non-production environment like specifying detailed environment requirement, associating data, determining environment smoke test, understanding current situation application architecture, scheduling team dependencies, service level agreements, auditing, access control, share environments but they do not suggest or anticipate a systematic formalized process or framework for management of non-production environment. The prior art do not disclose the assessment of viability of various tools that helps in provisioning and management of non-production environment services.

Accordingly there is need of framework which can ensure effective management and governance of test or non-production environment, identify various roles and outlines their responsibilities that will involve proactive planning in line with the best of technology solutions. There is need of non-production environment management framework that can be continuously improved and evolved along with the need of organization.

BRIEF DESCRIPTION OF THE DRAWINGS

FIG. 4 shows an exemplary roles matrix for various stages of non-production environment management framework;

While systems and methods are described herein by way of example and embodiments, those skilled in the art recognize that systems and methods for management of non-production environment are not limited to the embodiments or the diagrams described. It should be understood that 'non-production environment' and 'test environment', and 'environment management' and 'environment services' may be used interchangeably. It should be understood that drawings and descriptions are not intended to be limiting to the particular form disclosed. As used herein, environment implies non-production environment unless indicated otherwise, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented method, systems and computer readable media for management of non-production environment.

According to an embodiment of the invention a non-production environment is a single group of related applications and associated data, hosted on a single or multiple servers, created to functionally mirror production or future production. Further as used in context with this description, a non-production environment management framework refers to framework customization for management of non-production environment to offer services to non-production environment throughout lifecycle of non-production environment. The purpose of framework customization is to capture, clarify and document the specific goals and objectives for management of non-production environment. The stages of framework may cover all standard and bespoke requests for non-production environment provisioning and management. Furthermore the steps are followed to provide the environment services group a universal theme for providing these services regardless of the size of IT project, change program and/or business support.

Figure 1:
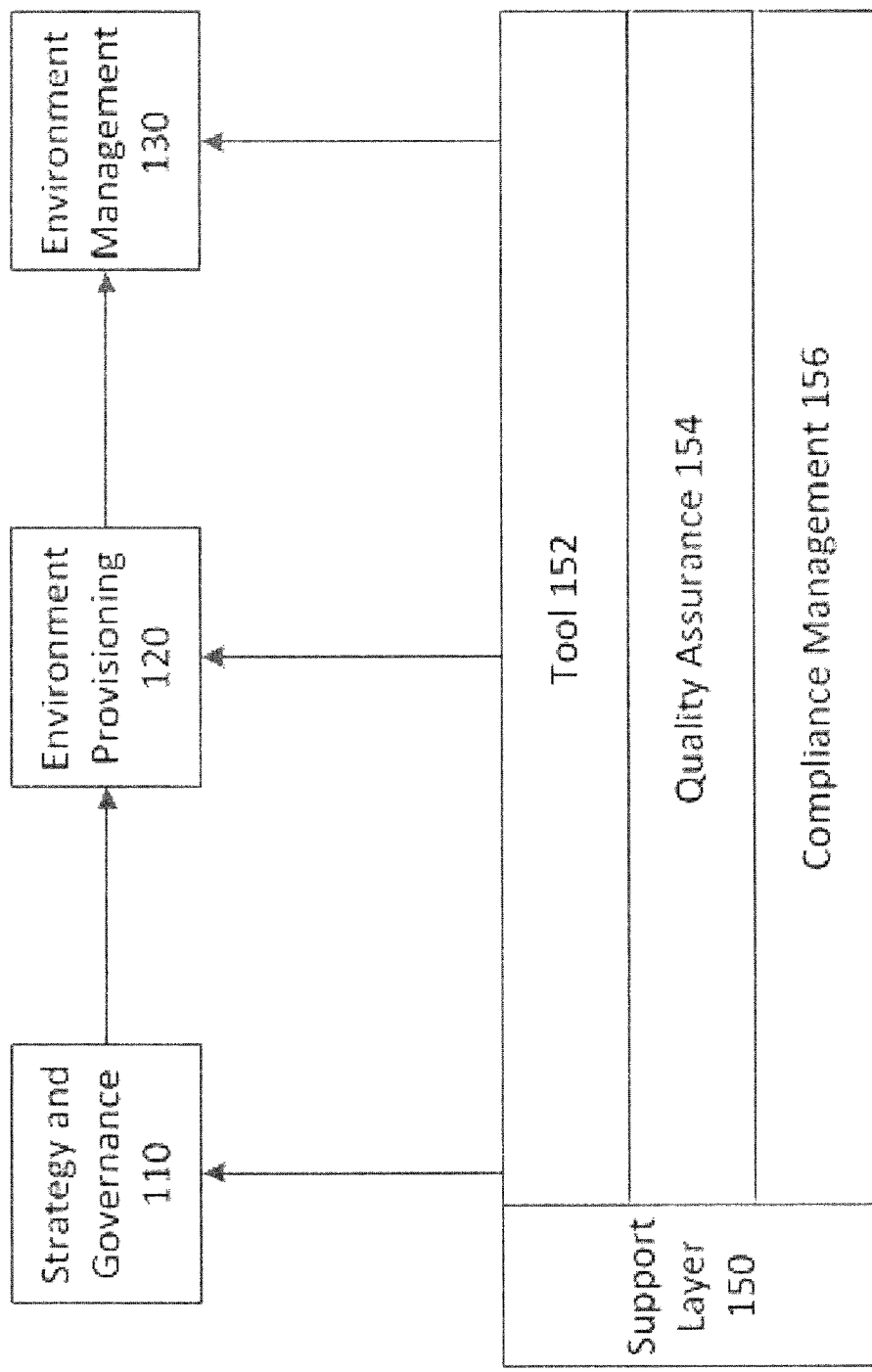
FIG. 1 shows an exemplary architecture for non-production environment management framework.

FIG. 1 shows an exemplary architecture for management of non-production environment framework. FIG. 1 includes the stage of strategy and governance 110, a stage for environment provisioning 120, and a stage for environment management 130. According to an embodiment of the invention 110 is stage of strategy and governance. It focuses on constantly innovating and continuously improving the non-production environment, management of non-production environment and the ways to deliver the non-production environment related services. Further non-production environment services consider, review, and adopt the new technological advancements and proactively plan adoption of new technologies. Still further the non-production environment management framework is adhered to changing project lifecycles. Furthermore policies and guiding principles of non-production environment management are updated as and when required. The strategy and governance 110 may depend upon plurality of parameters which include but is not limited to strategy planning, technology adoption, demand management, operating model, policies and principles, service improvement, charge back and finance management and alignment with other frameworks.

According to an embodiment of the invention 120 is stage of environment provisioning. The provisioning of non-production environment services is the core building block for providing non-production environment services to the IT programs, IT projects, and test services which require new set-up of non-production environment to conduct testing. Further environment provisioning 120 comprises of stages engagement and planning 220, requirement analysis and design 230, creation and deployment 240.

According to an embodiment of the invention 130 is step of environment management. The environment management 130 of non-production environment comprises of test support and co-ordination 250, and, allocation and booking 260. The application management group of non-production environment requires releases and patch upgrades from time to time. The stage 130 ensures that application management group meets the requirements to develop and test their release. Further it takes care of Information Technology (IT) services management requirement pertaining to non-production environment. IT services management requirements includes but is not limited to incident management, change management, access management, service request management, code migration and infra monitoring. It supports constant needs to optimize non-production environment usage and re-usage. Furthermore it also supports the capacity management analysis of various elements of non-production environment infrastructure.

According to an embodiment of the invention the components 110, 120 and 130 is supported by a support layer 150. The support layer 150 may be a component outside the non-production environment. The support layer comprises of tools 152, quality assurance 154, and security and compliance management 156. Tools 152 are assessed to check there suitability for the use and purpose. The non-production environment services may change depending upon the requirement. There may be constant assessment of scalability of tools 152 which are used for providing non-production environment services. Further the quality assurance theme 154 of support system 150 ensures that pluralities of attributes related to non-production environment services are kept up-to-date. These attributes include but is not limited to documents, handshake criteria and templates. Further the security and compliance management theme 156 of support system 150 ensures that the non-production environment services comply with the overall security and compliance policy of the IT organization.

Figure 2:
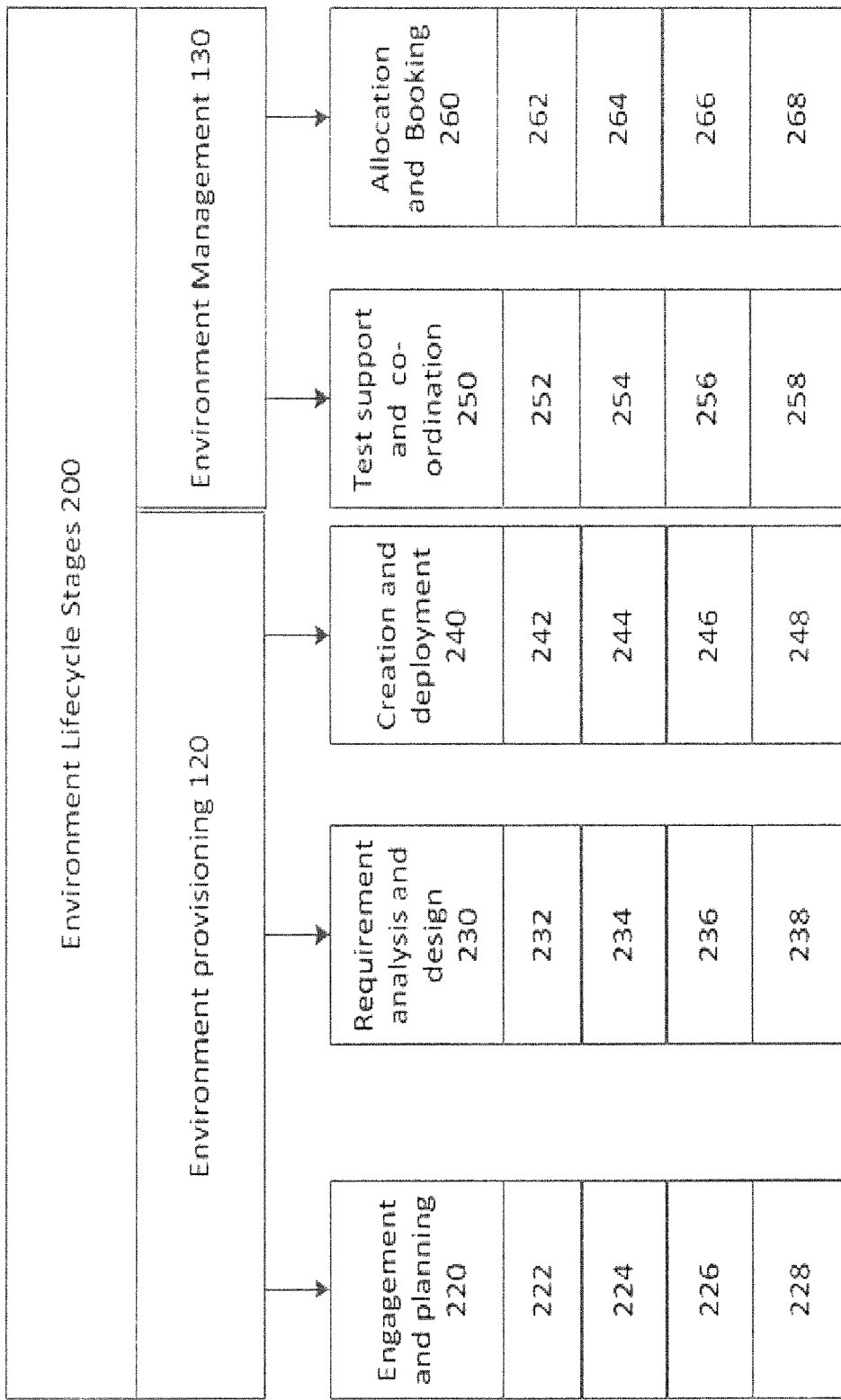
FIG. 2 shows an exemplary architecture for non-production environment management framework stages.

FIG. 2 shows an exemplary architecture for non-production environment management framework stages. According to an embodiment there may be five stages of non-production environment lifecycle. Further the non-production environment lifecycle stages may be classified under environment provisioning 120 and environment management 130. Further the environment provisioning 120 comprises of stages engagement and planning 220, requirement analysis and design 230 and, creation and deployment 240. Further the environment management 130 comprises of stages test support co-ordination 250 and allocation and booking 260.

According to an embodiment of the invention any new program or IT project will engage with the non-production environment services through the stage of engagement and planning 220. The business and on-going management of the non-production environment are performed within last two lifecycle stages test support and co-ordination 250, and allocation and booking 260.

According to an embodiment of the invention the attributes of stage engagement and planning 220 includes but is not limited to engagement with program management 222, input from environment service demand management 224, high level delivery plan 226 and cost estimation and feasibility analysis 228. Further the attributes of stage requirement analysis and design 230 includes but is not limited to finalization requirement 232, creation of environment design 234, validation with design standards 236 and, agreement on schedule, cost and Service level agreement 238. Further the attributes of stage creation and deployment 240 includes but is not limited to procurement and resourcing 242, build to specification and smoke testing 244, co-ordination with technology team 246 and handover and sign off acceptance criteria 248. Further the attribute of stage test support co-ordination 250 includes but is not limited to operational support to testing 252, IT service process management 254, Co-ordination for code migration 256, inventory and configuration management 258. Further the attributes of stage allocation and booking 260 includes but is not limited to environment ownership 262, environment booking and allocation 264, rationalization and consolidation 264, capacity management 268.

Figure 3:
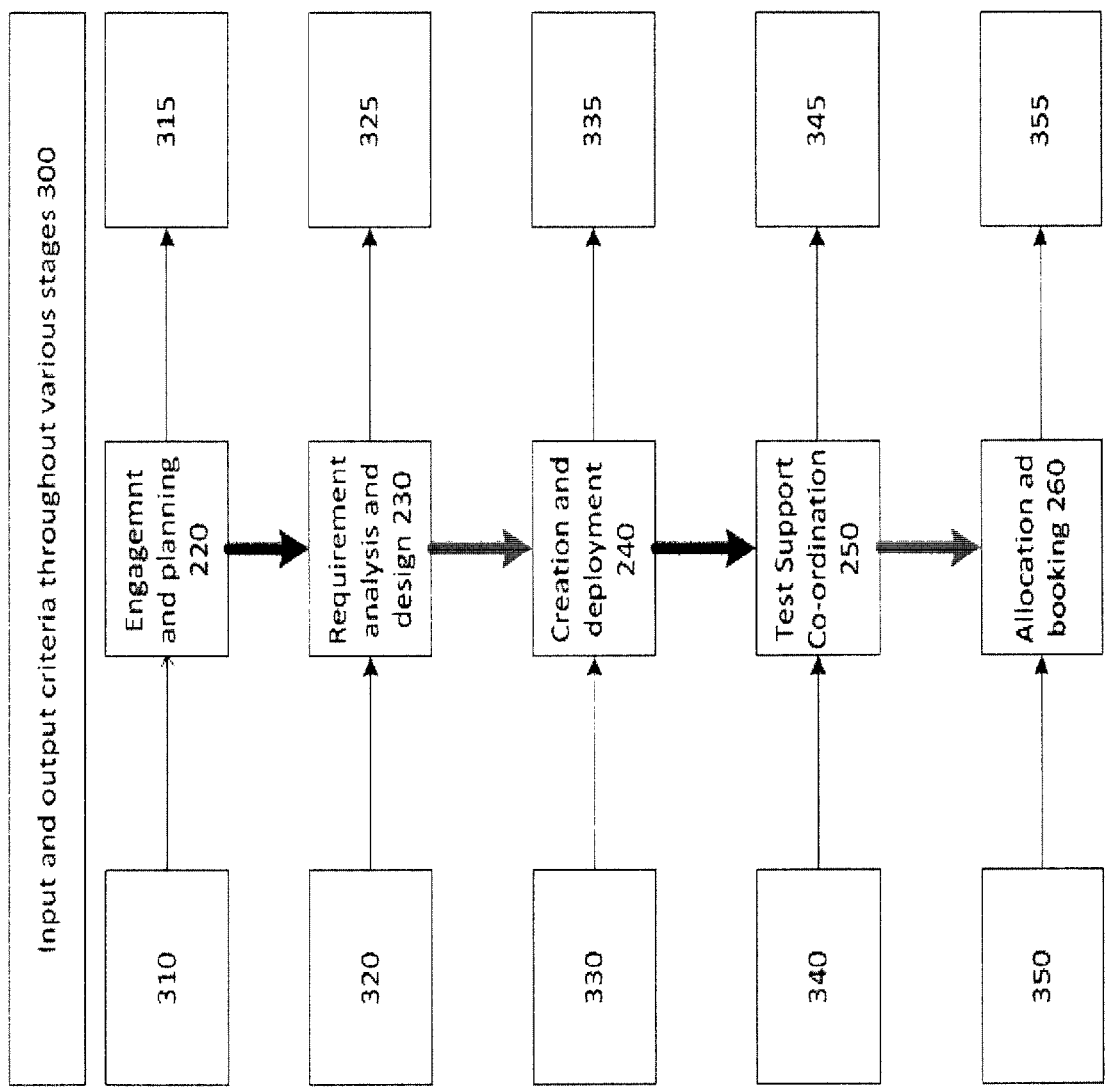
FIG. 3 shows an exemplary architecture of flow of various input and output criteria throughout the stages of non-production environment management framework.

FIG. 3 shows an exemplary architecture of flow of various input and output criteria throughout the various stages of non-production environment management framework. According to an embodiment of the invention there are pluralities of documents which act as input and output criteria throughout the non-production life cycle stages. The documents comprises of external documents and internal documents. External documents include documents produced by other allied teams and internal documents include documents created by non-production environment services during the lifecycle of non-production environment management.

According to an embodiment of the invention in stage of engagement and planning 220 entry criteria 310 includes but is not limited to high level solution design, high level milestone plan, test and test strategy. The output is internal document high level delivery plan 315. Further in stage of requirement analysis and design 230 the input criteria 320 includes but is not limited to external documents like project milestone plan, test plan, low level design, and system architecture document and internal document high delivery plan 315. The output criteria 325 includes but is not limited to non-production environment design document, bill of materials, delivery schedule and service level agreement, build plan and test acceptance criteria. Further in stage of creation and deployment 240 the entry criteria 330 includes but is not limited to internal documents like environment design document, bills of materials, delivery schedule and service level agreement (SLA) and build plan test acceptance criteria. The output criteria include internal documents but are not limited to relevant test acceptance criteria, smoke test report and recommendations. Further in stage of test support and co-ordination 250 the input criteria 340 includes but is not limited to external documents test plan, environment allocation and release calendar and internal document relevant test acceptance criteria. The output criteria include but are not limited to internal documents like service reports, inventory or configuration report and recommendations. Further in stage of allocation and booking 260 the entry criteria includes but is not limited to external documents non-production environment request and test completion report. The output criteria includes but is not limited to internal document like updated environment layout, updated availability calendar and environment decommissioning report.

According to an embodiment of the invention various lifecycle stages of the non-production environment management framework have key roles. The roles support the non-production environment. Each role has various responsibilities and various roles can be a shared responsibility by an individual person. Further role sharing depends on the size of the project or program and some of the very large programs may require individual people playing each of the roles. The key roles consist of internal Environment Services (ES) roles and external roles. Further engagement and planning 220 includes the Environment Services (ES) roles like ES Project Manager (ESPM), ES Project Analysts (ESPA) and external roles like IP Project Manager (ITPM), Test Manager (TM), and Solution Architect (SA). The stage 230 includes ES roles like ES Delivery Manager (ESDM), ES Project Manager (ESPM), ES Design Analyst (ESDA) and Build Manager (BM), and external roles like Test Manager (TM), IT Project Manager (ITPM) and Solution Lead Architect (SLA). The stage 240 includes ES roles like build manager, ES delivery manger, ES project manager and external roles like test manger, technology analyst, code migration team, functional test manager, release manager etc. Stage 250 includes ES roles like environment lead, inventory management, configuration management and external roles like test manger, defect manger, domain test manager, functional test manager, release manager, technology analyst, code migration team. The stage 260 includes ES roles like environment lead capacity manager and external roles like test manager, application owner, release manager, code migration team.

FIG. 4 shows an exemplary roles matrix for various stages of non-production environment management framework. Similar matrix can be used for all the stages of the lifecycle depending upon the stage activities. According to an embodiment of the invention roles can be classified as 'responsible role' represented by 'R', 'Accountable role' represented by 'A", 'Consulted' represented by 'C', 'Informed' represented by 'I'. Responsible implies responsible for the performance of the task or activity. Further multiple roles can share the responsibility. Accountable indicates accountable for the task or activity that is completed in committed time and costs. Only one role will be accountable. Consulted implies those whose opinions are sought; and with whom there is two-way communication between those who are responsible or accountable and those who are consulted. Informed implies those who are kept up to date with the progress, and with whom there is one-way communication from those who are responsible or accountable.

According to an embodiment of the invention the stage engagement and planning 220 is the first stage or phase of the non-production environment management framework for managing non-production environment lifecycle. At this stage non-production environment services start engaging with functional groups such as IT Change Programs or Projects, Test Services, Solution Design, Procurement, etc. It is at this stage, the initial planning for non-production environments begins. During engagement & planning, the non-production environment services team prepares the High Level Environment Delivery Plan based on inputs from Project Definition Documents, Business Case, High Level Milestone Plan and a High Level Design. The high level timelines and related commitments are also agreed. At this stage, a single point of contact from the non-production environment services team is also identified for the stakeholders.

Figure 5:
FIG. 5 shows an exemplary process flow in engagement and planning stage of non-production environment management framework.

FIG. 5 shows an exemplary process flow in stage of engagement and planning 220 of non-production environment management framework for managing non-production environment lifecycle. It includes entry criteria 510, inputs 520, key activities 530, output 540 and exit criteria 550. Entry criteria 510 includes but is not limited to baseline of high level requirement, agreement on high level solution, completion of project definition document and agreement on test strategy. Input 520 comprises of agreed high level solution, agreed test strategy and high level milestone plan. Key activities 530 includes but is not limited to engagement with different IT program or project managers to capture demand for environment, preparation of demand pipelines for environment, gathering further details on requirements, interaction of ES project manager with assigned test managers, mapping of ES project manager to the particular requirement and obtain the agreed high level solution, high level test strategy and high level milestone plan, preparation of high level environment delivery and sharing with key stakeholders like IT project manager and test manager, documentation of high level plan, feasibility analysis and cost estimation of the requirement, publication of analysis report to ES managers and discussion with IT manager and test manager, further update of high delivery plan based upon inputs, engagement of procurement team if required, creation of Bill of material after authorization by IT or project manager. Further output 540 includes plurality of document like formally logged environment requirement and high level environment delivery plan. Further Exit criteria 550 includes plurality of attributes like feedback of cost estimation to Program or project business case, agreement of stakeholders on feasibility analysis, circulation of high level environment delivery plan. Further engagement and planning stage 220 includes key roles consisting of internal role like ES project manager and project analysts and external roles like IT project manager, test manager and solution architect.

According to an embodiment of the invention the stage of requirement analysis and design 230 deals with requirement analysis by finalizing the requirements and analyzing it. Analysis consists of reviewing the lower level document and non-production environment design for risks, adherence to enterprise architecture standards and referring to the system architecture document and in line with the test plan for validity. During this phase, the high level design is converted into the low level design. Further high level design is the estimation or overview and low level design is the actual details pertaining to the requirements of non-production environment. Based on this, the non-production environment services team creates the non-production environment design document. This provides the basis for the build or creation team to carry out the creation or build activities in the next lifecycle stage. The service level agreement (SLA) and timelines are finalized at this stage.

Figure 6:
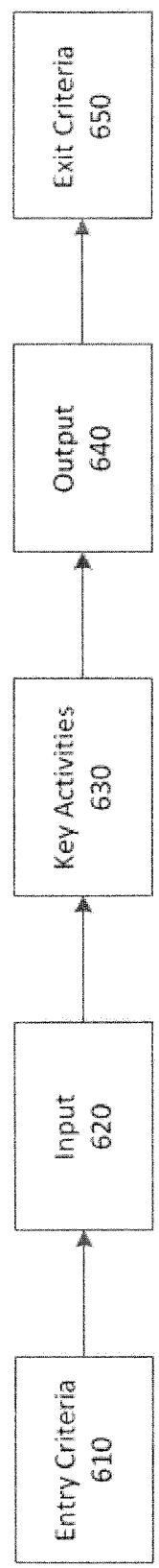
FIG. 6 shows an exemplary process flow in requirement analysis stage in non-production environment management framework.

FIG. 6 shows an exemplary process flow in stage requirement analysis and design 230 in non-production environment management framework. It includes entry criteria 610, input 620, key activities 630, output 640 and exit criteria 650. According to an embodiment of the invention entry criteria 610 includes but is not limited to alignment of IT change program or project, signing off detailed test plan, creation and approval of low level design and system architecture document, feedback of cost estimates to program or project business case, agreement of stakeholders on feasibility analysis and circulation of high level environment delivery plan. Further input 620 includes pluralities of attributes like agreed timelines from IT change program or project, signed off test plan and low level design, system architecture document environment requirement and high level environment delivery plan. Key activities 630 include but are not limited to creation of detailed non-production environment delivery plan by environment services project managers, creation of environment delivery schedule and service levels to which environment will be delivered which may be a joint effort of environment service project manager and delivery manager and test manger, engagement of environment service design analyst with solution architects, technical design architects and test manager to validate and verify non-production environment design document, interaction of ES delivery manager with procurement to obtain details of delivery of new infrastructure, software, etc., and feed into the environment delivery schedule, creation of detailed Bill of Material, handing over to procurement and fixing timelines for delivery of material, finalization of Service Level Agreement and acceptance criteria in consultation with IT program or project manager and test manager, conversion of high level plan to baselines delivery plan. Furthermore at this stage the approved non-production environment design document will become the basis for build teams to start their activities wherein after finalization of delivery schedule a build manager is assigned and build plan is created and finalized. Output 640 includes a plurality of attributes like completed Bill of Materials, signed off non-production environment design document, completed build plan, delivery schedule and Service Level Agreement acceptance criteria. Exit criteria 650 includes but is not limited to submission of Bill of Material to procurement, agreement of environment delivery schedule, signing off acceptance criteria, agreement for delivery, identification and engagement of build manager, agreement on build plan. Further stage requirement analysis and design 230 includes the key roles consisting of internal roles like ES delivery manager, ES project manager, ES design analyst and build manager and external roles like test manager, IT project manager, technical design manager and solution lead architect.

According to an embodiment of the invention in stage creation and deployment 240, the non-production environment is built or created on the basis of non-production environment design document. This can also be called as build, deploy and handover stage. There is management of interaction with multiple technology teams and co-ordination of build activities. At the end of this stage built non-production environment is made test ready where non-production environment is deployed in identified data center and handed over to test services through a checklist driven mechanism.

Figure 7:
FIG. 7 shows an exemplary process flow in creation and deployment stage of non-production environment management framework.

FIG. 7 shows an exemplary process flow in stage creation and deployment 240 of non-production environment management framework. It includes entry criteria 710, inputs 720, key activities 730, output 740 and exit criteria 750. According to an embodiment of the invention entry criteria 710 includes a plurality of parameters like procurement of materials as per plan, agreement of environment delivery schedule, signing off of acceptance criteria, agreement of Service Delivery Agreement, identification and engagement of build manager, sending requirement for data and code to respective teams, sharing non-production environment design with all stakeholders. Inputs 720 includes but is not limited to completed Bill of Materials, signed off non-production environment design documents, completed build plan, agreed delivery schedule and service level agreement, agreed and documented acceptance criteria. Key activities 730 includes but is not limited to ensuring by ES delivery manager that necessary procurement has been completed as per plan and deployed at the identified data center, information of these activities to stakeholders by delivery manager, identification of required resources from each technology domain within IT operations estimation of effort required for building and smoke testing and booking resources using the existing resources booking methods wherein identification of resources, estimation and booking is done by build manager from infrastructure delivery team, booking of non-production environments with non-production environment lead for existing non-production environments that will be required for building the requested non-production environment wherein booking is done by ES delivery manager, escalation of technical issues to vendors, design teams, test managers by the build manager and resolving them through co-ordination with the necessary teams or personnel wherein resolution is done by ES delivery manager, updating status to stakeholders and feeding inputs wherein update is done by ES project manager and input is given by build manger and ES delivery manager, interaction of ES delivery manger with data management and code migration teams to line up resources for agreed deployment as informed by the test manager, engagement of ES delivery manager with system monitoring with in IT operations to set up monitoring for the non-production environment during span of testing, co-ordination of activities for smoke testing wherein co-ordination is done by build manager after the non-production environment is built as per specification, completion of code migration by respective resources as per non-production environment plan and delivery design and loading desensitized data wherein required co-ordination is done by ES delivery manager, revoking access provisioned for smoke testing upon completion of successful smoke testing, code migration and data load, conduct of shakedown testing by build manager to ensure that the defined infrastructure and application build handed over by the technology analyst(s) is fit for purpose which protect the formal test phase by identifying and resolving significant infrastructure related defects early thus reducing likelihood of infrastructure defects during formal testing phase and providing confidence to the relevant test manager that the infrastructure delivered can support the formal test phase, confirmation of completion of build to test manager wherein confirmation is done by ES delivery manager, discussion on acceptance criteria and agreed service level agreement, upon signing off of acceptance criteria providing access to the required members of domain testing teams, functional testing teams and the non-functional testing teams as prescribed by the test manager, activation of applied system monitoring, processing on-boarding of non-production environment for test support wherein ES delivery manager book technology analysis team to provide technology support during testing and ES project manager in consultation with build manger and test manager will estimate the effort, updating inventory register and Configuration Management Database (CMDB) wherein input for this is provided by build manager. Output 740 includes the attributes like environment smoke test output documents and signed off acceptance criteria. Exit criteria 750 includes but is not limited to successful smoke testing of completed non-production environment, completion of security verification, signing of acceptance criteria by test manger, providing required access to non-production environment, updating inventory register and CMDB, publication of service level agreement and delivery schedule, drafting recommendation, completing onboarding of non-production environment. Further creation and deployment stage 240 includes key roles consisting of internal roles like build manager, ES delivery manager and ES project manager and external roles like test manager, technology analyst, code migration team, data management team, application management team, legacy application team and release manager.

According to an embodiment of the invention stage test support and co-ordination 250 coordinates the on-going supports to test services via established Information Technology (IT) service management processes. The key support processes includes but is not limited to service request management, access management, change management, incident management, code migration and infra monitoring. Before the commencements of test the monitoring of the non-production environment is set up and configured to generate automated alerts, test support co-ordinates with the relevant team to drop the right piece of code on the right non-production environment. Test Support will co-ordinate with the technology teams in IT Operations to get the issues resolved, changes implemented, etc. These technology teams are the same as the build teams. Time booking for such resources is done by the ES delivery manager towards the end of creation and deployment stage 240.

Figure 8:
FIG. 8 shows an exemplary process flow in test support and co-ordination stage of non-production environment management framework.

FIG. 8 shows an exemplary process flow in stage test support and co-ordination 250 of non-production environment management framework. It includes entry criteria 810, input 820, key activities 830, output 840, and exit criteria 850. According to an embodiment of the invention entry criteria 810 includes but is not limited to successful smoke testing of completed non-production environment, security verification, signing off acceptance criteria by test manager, providing required access to non-production environment, publication of report on adherence to SLA and delivery schedule, booking of IT operations technical resources, code migration team and data management team, activation of system monitoring for required environment, providing test plan to non-production environment lead, completing non-production environment allocation, updating inventory and CMDB, enlisting recommendations, completing on-boarding of non-production environments for test support. Input 820 consists of attributes like signed off test plan documents, completed non-production environment allocation, updated resource booking sheet with various allied teams, accessing requests for test environments, release calendar, signed off acceptance criteria. Key activities 830 includes but is not limited to establishing communication with assigned defect manager and identified testing team to discuss release Calendar, the support plan, duration, SLA, standard or regular activities, governance forums, scheduled status meetings, etc. wherein communication is established by environment lead, ensuring availability the aligned support personal outside ES during testing period wherein this activity is carried out by environment lead and it becomes the point of contact for the application owner and the release manager for that release, after commencement of testing providing continuous support to testing or project teams for any Information Technology service management needs, resolving issues, conflict etc. through an established escalation mechanism, migrating code from one environment to another wherein co-ordination for migration is done by environment lead and migration is carried out by the resources booked from the Code Migration team, coordinating data related requests and carrying out required activity wherein co-ordination is done environment lead and actual activity will be carried out by the identified resources of the Data Management team, recording the changes carried out in environment wherein recording is done in the inventory and configuration management databases, producing service reports on a regular basis as agreed with the test manager and present the states to the identified governance forum and providing regular status updates to the stakeholders, such as IT program, project manager and test manager wherein reports and produced by environment lead, revoking the access to test environment once the test is concluded, ensuring that open requests are closed, producing the end of test support report, providing recommendation, taking handover of the non-production environment and ensuring authorized access by non-production environment lead, publication of end of test support report and recommendation documents to all stakeholders wherein stakeholders includes booked resources for support from IT operations, data management and code management. Output 840 includes the attributes like service report for support process, end of test support report, recommendation documents, updated environment inventory and CMDB. Exit criteria 850 include but are not limited to publishing service report, updating of inventory and CMDB, handing over environ to environment lead, revoking access to environments. Further 250 includes key role consisting of internal roles like environment lead, ES project manager, inventory management and configuration management and external roles like test manager, defect manager, domain test manager, functional test manager, release manager, technology analyst, service management team, code migration team and data management team.

According to an embodiment of the invention stage test allocation and booking 260 covers the on-going activities required by environment services to support the existing non-production environment estate. The Environment Services remains the overall owner of the environment. Environment services manage the on-going booking and allocation of the non-production environment through various in-house and third party tools. A continuous assessment of the existing capacity of the various components within the non-production environment needs assessment to keep the non-production environment optimally utilized. The Environment Services constantly assesses the non-production environment so that the non-production environment can be re-used wherever possible.

Figure 9:
FIG. 9 shows an exemplary process flow in allocation and booking stage of non-production environment management framework.

FIG. 9 shows an exemplary process flow in stage allocation and booking 260 of non-production environment management framework. It includes entry criteria 910, input 920, key activities 930, output 940 and exit criteria 950. According to an embodiment of the invention entry criteria 910 includes but is not limited to handing over environments to environment leads, releasing manager or application owners requests for environments, updating environment availability calendar, releasing calendar from program or projects and live applications, decommissioning environment. Input 920 consists of attributes like completed environment requests form and confirmation of testing completion. Key activities 930 includes but is not limited to requesting for an existing environment by release manager or application owner wherein request id one by completing or filling environment request form and sharing the signed off test plan, reviewing the request, referring release calendar, checking environment availability calendar, discussing status with requester and blocking the slot wherein all these activities are done by environment lead, confirmation of the schedule and booking of Code Migration and Data Management resources by application owner or release manager, receiving confirmation by environment lead and allocating blocked slot for requested testing, confirmation of availability of resources by release manager, coordination of environment lead with ES support analyst and technology team to book time for support, managing escalation by environment lead and providing on going test support and co-ordination by ES support analysts, revoking of access IDs by environment lead, publishing service reports, providing input to update inventory and CMDB by environment lead, deciding the state of environment wherein state can be existing state or 're-base lined' in accordance with need wherein decision is taken by ES lead in consultation with IT program or project manager and test manager, termination and cancellation of not required monitoring and support services and license agreements respectively by environment lead, ensuring by environment lead the ongoing re use of environment. Output 940 includes the attributes like updated environment layout plans, up-to-date environment availability calendar and environment decommission report. Exit criteria 950 includes but is not limited to up to date availability calendar, deciding and carrying out rebase lining, up to date environment lay out diagrams, up-to-date inventory and CMDB. Further allocation and booking stage 260 includes key roles consisting of internal roles like environment lead, technology analysts and capacity manager and external roles like test manager, application owner, release manager, code migration team and data management team.

Figure 10:
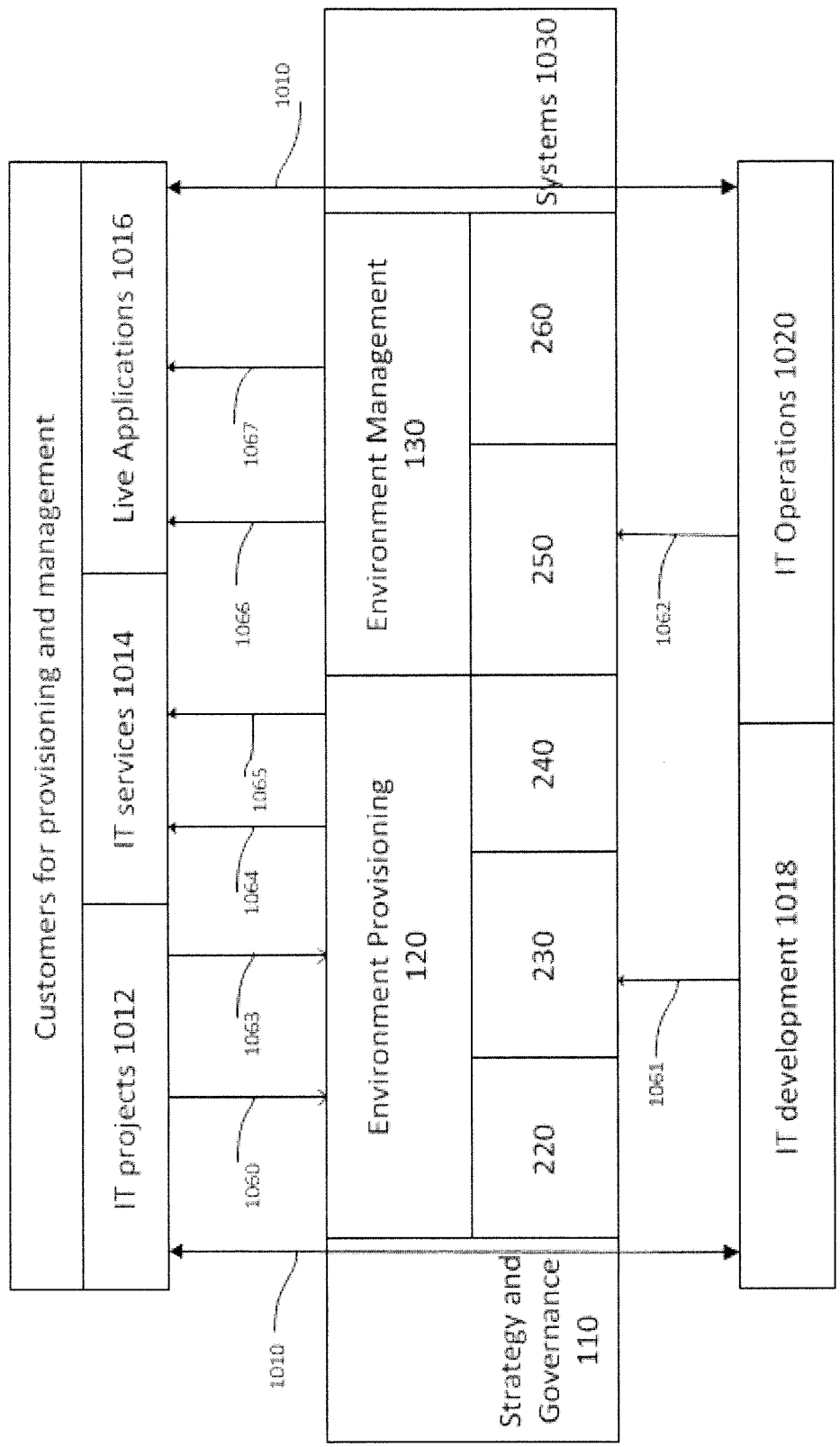
FIG. 10 shows an exemplary architecture of non-production environment management framework operating model.

FIG. 10 shows an exemplary architecture of non-production environment management framework operating model. According to an embodiment of the invention the non-production environment operating model is based on the core components of the non-production environment management framework. It describes the framework stages along with its interaction 1010 with allied teams. The Environment Provisioning 120 and Environment Management 130 receive inputs from IT Projects 1012, IT Development 1018 and IT Operations 1020. The inputs include but are not limited to IT project 1060, design 1061, test strategy and plan 1062 and build and support 1063. The Environment Services provides delivery of test ready non-production environment and manage non-production environment through these various inputs. Environment services are delivered to customers consisting of groups like IT projects 1012, test services 1014 and the application management 1016, and IT development 1018 groups. IT development 1018 includes but is not limited to solution design, technical design, security management, code or data management and IT deliveries. IT operations 1020 includes but is not limited to environment computing, service operations, application support, IT service management and networks. Services delivered include but is not limited to environment design 1064, test ready environment 1065, test support 866 and managed environment 1067. During delivery of environment services plurality of systems 1030 consisting Configuration Management System, Monitoring System, Inventory and Asset Management System and Reporting Tools are constantly updated. Further strategy and governance 110 provides constant guidelines on new technology adoption and tools, service improvement plans and tracks financial costing and charge backs.

Figure 11:
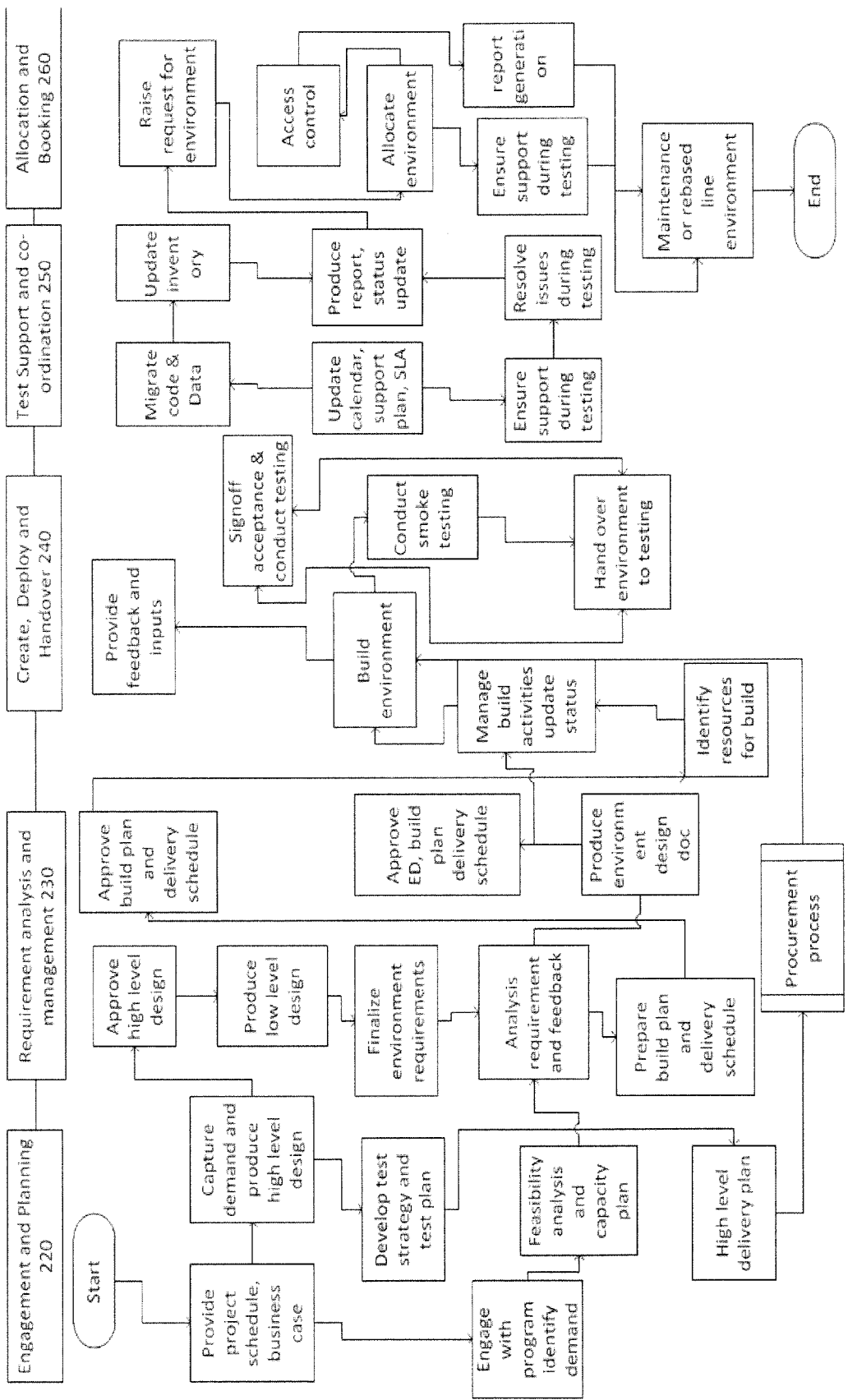
FIG. 11 shows an exemplary workflow in non-production environment management framework.

FIG. 11 shows an exemplary workflow of non-production environment management framework. According to an embodiment of the invention there is constant work flow between all the stages of the non-production environment management framework for management of non-production environment. Further the flow continues throughout the life cycle of non-production environment which starts with engagement and planning and ends at allocation and booking phase of the environment. There is continuous assessment throughout to meet the requirement of project and implement the required changes or demand.

Figure 12:
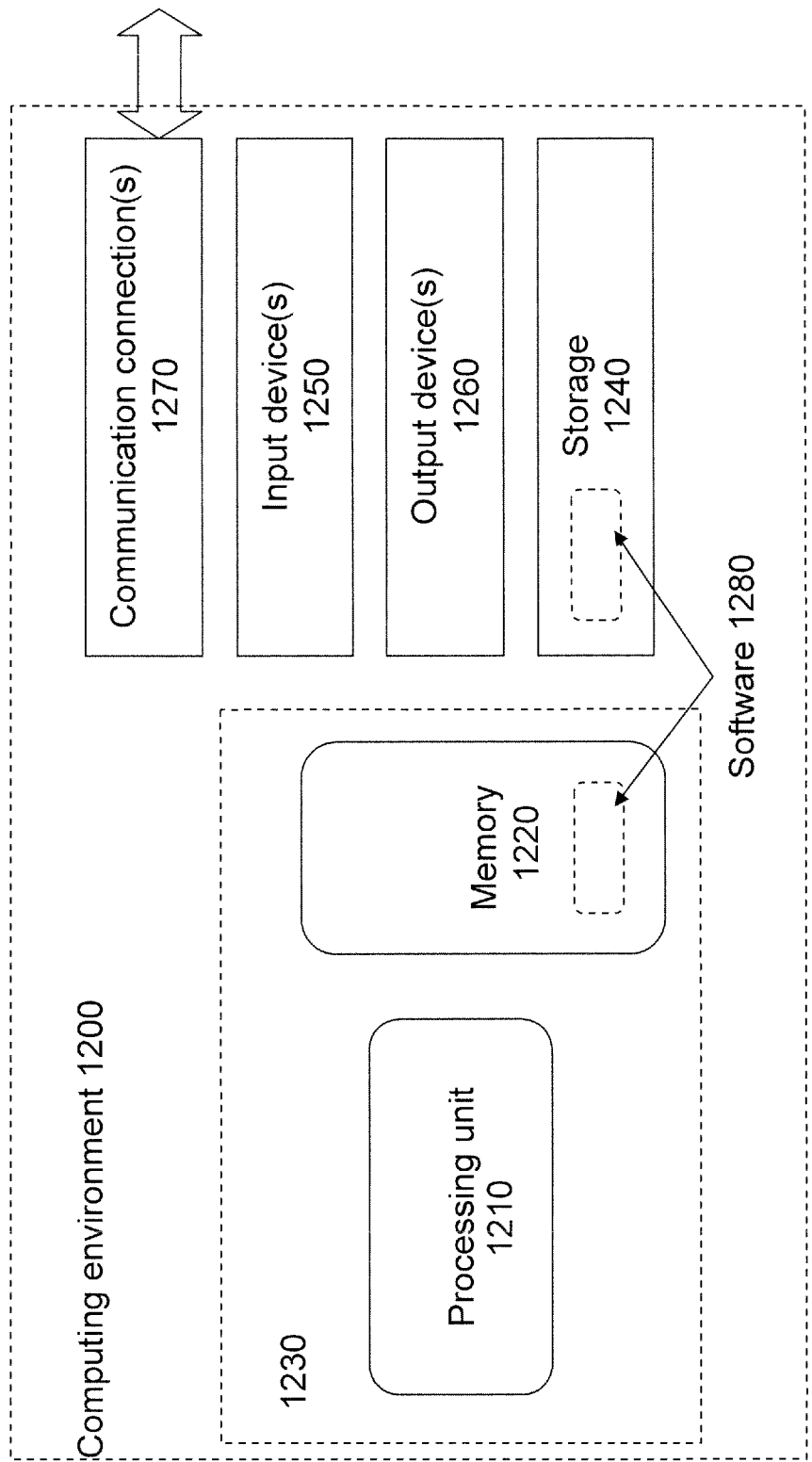
FIG. 12 shows an exemplary computing environment.

FIG. 12 shows an exemplary computing environment. One or more of the above-described techniques can be implemented in or involve one or more computer systems. FIG. 12 illustrates a generalized example of a computing environment 1200. The computing environment 1200 is not intended to suggest any limitation as to scope of use or functionality of described embodiments.

With reference to FIG. 12, the computing environment 1200 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power. The memory 1220 may be volatile memory (e.g., registers, cache, RAM), non-volatile memory (e.g., ROM, EEPROM, flash memory, etc.), or some combination of the two. In some embodiments, the memory 1220 stores software 1280 implementing described techniques.

A computing environment may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and which can be accessed within the computing environment 1200. In some embodiments, the storage 1240 stores instructions for the software 1280.

The input device(s) 1250 may be a touch input device such as a keyboard, mouse, pen, trackball, touch screen, or game controller, a voice input device, a scanning device, a digital camera, or another device that provides input to the computing environment 1200. The output device(s) 1260 may be a display, printer, speaker, or another device that provides output from the computing environment 1200.

The communication connection(s) 1270 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1200, computer-readable media include memory 1220, storage 1240, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for managing non-production environments, the method comprising:
    planning, by an environment management computing device, at least one non-production environment design for a non-production environment, the non-production environment design comprising a first set of design data comprising one or more of high level solution data, environment delivery plan data, milestone plan data, or test strategy data;
    analyzing, by the environment management computing device, the at least one planned non-production environment design to generate a non-executable second set of design data from one or more portions of the first set of design data, the second set of design data comprising a lower level of detail than the first set of design data and a plurality of requirements of the non-production environment;
    creating, by the environment management computing device, the non-production environment based on the analyzed non-production environment design and the second set of design data; and
    deploying, by the environment management computing device, the created non-production environment and managing requests for access to the non-production environment, wherein the non-production environment comprises a plurality of related applications and associated data and is configured to host one or more applications being tested.

2. The method of claim 1, further comprising providing, by the environment management computing device, support to the non-production environment during its life cycle via established Information Technology service management processes comprising one or more of service request management, access management, change management, incident management, code migration, or infrastructure monitoring.

3. The method of claim 1, further comprising assessing, by the environment management computing device, one or more steps of the non-production environment during a life cycle of the non-production environment.

4. The method of claim 1, wherein the analyzing the at least one planned non-production environment design is based on one or more inputs comprising agreed timelines from an information technology (IT) change program or project, a signed off test plan, a system architecture document, or the environment delivery plan data.

5. The method of claim 1, wherein the planning the non-production environment design is based on one or more inputs comprising a project initiation document or business case data.

6. An environment management computing device, comprising a memory; and a processor operatively coupled to the memory, the processor configured to execute programmed instructions stored in the memory to perform steps comprising:
    planning at least one non-production environment design for a non-production environment, the non-production environment design comprising a first set of design data comprising one or more of high level solution data, environment delivery plan data, milestone plan data, or test strategy data;
    analyzing the at least one planned non-production environment design to generate a non-executable second set of design data from one or more portions of the first set of design data, the second set of design data comprising a lower level of detail than the first set of design data and a plurality of requirements of the non-production environment;
    creating the non-production environment based on the analyzed non-production environment design and the second set of design data; and
    deploying the created non-production environment and managing requests for access to the non-production environment, wherein the non-production environment comprises a plurality of related applications and associated data and is configured to host one or more applications being tested.

7. The device of claim 6, wherein the processor is further configured to execute additional programmed instructions stored in the memory to perform at least one additional step comprising providing support to the non-production environment during its life cycle via established Information Technology service management processes comprising one or more of service request management, access management, change management, incident management, code migration, or infrastructure monitoring.

8. The device of claim 6, wherein the processor is further configured to execute additional programmed instructions stored in the memory to perform at least one additional step comprising assessing one or more steps of the non-production environment during a life cycle of the non-production environment.

9. A non-transitory computer readable medium having stored thereon instructions for comprising executable code that when executed by at least one processor causes the processor to perform steps comprising:

planning at least one non-production environment design for a non-production environment, the non-production environment design comprising a first set of design data comprising one or more of high level solution data, environment delivery plan data, milestone plan data, or test strategy data;

analyzing the at least one planned non-production environment design to generate a non-executable second set of design data from one or more portions of the first set of design data, the second set of design data comprising a lower level of detail than the first set of design data and a plurality of requirements of the non-production environment;

creating the non-production environment based on the analyzed non-production environment design and the second set of design data; and deploying the created non-production environment and managing requests for access to the non-production environment, wherein the non-production environment comprises a plurality of related applications and associated data and is configured to host one or more applications being tested.

10. The non-transitory computer readable medium of claim 9, wherein the instructions further comprise executable code which when executed by the at least one processor causes the processor to perform steps further comprising providing support to the non-production environment during its life cycle via established Information Technology service management processes comprising one or more of service request management, access management, change management, incident management, code migration, or infrastructure monitoring.

11. The non-transitory computer readable medium of claim 9, wherein the instructions further comprise executable code which when executed by the at least one processor causes the processor to perform steps further comprising assessing one or more steps of the non-production environment during a life cycle of the non-production environment.

12. The device of claim 6, wherein the analyzing the at least one planned non-production environment design is based on one or more inputs comprising agreed timelines from an information technology (IT) change program or project, a signed off test plan, a system architecture document, or the environment delivery plan data.

13. The device of claim 6, wherein the planning the non-production environment design is based on one or more inputs comprising a project initiation document or business case data.

14. The non-transitory computer readable medium of claim 9, wherein the analyzing the at least one planned non-production environment design is based on one or more inputs comprising agreed timelines from an information technology (IT) change program or project, a signed off test plan, a system architecture document, or the environment delivery plan data.

15. The non-transitory computer readable medium of claim 9, wherein the planning the non-production environment design is based on one or more inputs comprising a project initiation document or business case data.

* * * * *